United States Patent
Wu et al.

(10) Patent No.: US 9,264,860 B2
(45) Date of Patent: Feb. 16, 2016

(54) COMMUNICATION SYSTEM WITH INDOOR NAVIGATION MECHANISM AND METHOD OF OPERATION THEREOF

(71) Applicant: Samsung Electronics Co., Ltd., Gyeonggi-Do (KR)

(72) Inventors: Yun Z. Wu, San Francisco, CA (US); Nastasha Tan, San Francisco, CA (US); Michael Baisuck, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 206 days.

(21) Appl. No.: 14/027,886

(22) Filed: Sep. 16, 2013

(65) Prior Publication Data

US 2014/0274165 A1    Sep. 18, 2014

Related U.S. Application Data (60) Provisional application No. 61/783,090, filed on Mar. 14, 2013.

(51) Int. Cl.
| | |
|---|---|
| *H04W 24/00* | (2009.01) |
| *H04W 4/04* | (2009.01) |
| *H04W 4/02* | (2009.01) |
| *G01C 21/00* | (2006.01) |
| *G06F 3/14* | (2006.01) |
| *G01C 21/20* | (2006.01) |
| *G01C 21/36* | (2006.01) |

(52) U.S. Cl.
CPC .............. *H04W 4/043* (2013.01); *G01C 21/00* (2013.01); *G01C 21/206* (2013.01); *G01C 21/3697* (2013.01); *G06F 3/14* (2013.01); *H04W 4/021* (2013.01)

(58) Field of Classification Search
CPC ...... H04W 4/043; H04W 4/021; G01C 21/00; G01C 21/206; G01C 21/3697; G06F 3/14
USPC .............. 455/414.1, 457; 701/438; 705/26.61
See application file for complete search history.

(56) References Cited

U.S. PATENT DOCUMENTS

| | | | |
|---|---|---|---|
| 8,320,939 | B1 | 11/2012 | Vincent |
| 8,346,477 | B2 | 1/2013 | Harding |
| 8,898,008 | B2 * | 11/2014 | Li ................................. 701/438 |
| 2008/0052105 | A1 | 2/2008 | Jin et al. |
| 2010/0274476 | A1 | 10/2010 | Kojima et al. |
| 2012/0130632 | A1 | 5/2012 | Bandyopadhyay et al. |
| 2012/0214515 | A1 | 8/2012 | Davis et al. |
| 2014/0171039 | A1 * | 6/2014 | Bjontegard ............... 455/414.1 |
| 2014/0207615 | A1 * | 7/2014 | Li et al. ..................... 705/26.61 |

FOREIGN PATENT DOCUMENTS

| | | |
|---|---|---|
| KR | 10-2011-0008710 A | 1/2011 |
| KR | 10-2011-0089023 A | 8/2011 |
| KR | 10-2012-0095247 A | 8/2012 |

* cited by examiner

*Primary Examiner* — Amancio Gonzalez
(74) *Attorney, Agent, or Firm* — IP Investment Law Group (57) ABSTRACT

A communication system includes: a first storage unit configured to receive relevant information by entering a region of interest; a first control unit, coupled to the first storage unit, configured to parse the relevant information; and a display, coupled to the first control unit, configured to display the relevant information, a target object, and a suggested path.

20 Claims, 6 Drawing Sheets

COMMUNICATION SYSTEM WITH INDOOR NAVIGATION MECHANISM AND METHOD OF OPERATION THEREOF

CROSS-REFERENCE TO RELATED APPLICATION(S)

This application claims the benefit of U.S. Provisional Patent Application Ser. No. 61/783,090 filed Mar. 14, 2013, and the subject matter thereof is incorporated herein by reference thereto.

TECHNICAL FIELD

An embodiment of the present invention relates generally to a communication system, and more particularly to a system for accessing the communication network between and among points of interest.

BACKGROUND

Mobile devices of today can perform multiple functions. They are communication devices, cameras, global positioning systems, day planners, contact organizers, and information sources. Most personal communication devices or smart phones possess more computing power than was available from the first mid-sized computer mainframes. Our personal communication devices can provide driving directions, access to the Internet, schedule alerts, or just a way to call home.

While the network power of the modern communication system can be tapped by the personal communication devices they do have limitations. When a user of a personal communication device enters enclosed shopping structures, such as a shopping mall, most of the functions of the personal communication device become useless. The structure of the shopping mall can disrupt signaling to cell towers or satellites that provide the all-important link between the personal communication device and the communication network.

In order to extend the communication to which we have become accustomed, these enclosed structures have added micro-towers laid-out within their structure in order to provide continued access to the communication network. While this continued access can be enjoyed by the patrons of the enclosed shopping mall, they don't provide any business benefit to the operators of the enclosed shopping structures.

Thus, a need still remains for a communication system with indoor navigation mechanism for providing extended communication capabilities within enclosed structures. In view of the ever increasing reliance on our personal communication devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a communication system, including: a first storage unit configured to receive relevant information by entering a region of interest; a first control unit, coupled to the first storage unit, configured to parse the relevant information; and a display, coupled to the first control unit, configured to display the relevant information, a target object, and a suggested path.

An embodiment of the present invention provides a method of operation of a communication system including: receiving relevant information by entering a region of interest; displaying on a display the relevant information of the region of interest; identifying a target object from the relevant information including identifying alternative sources of the target object; and overlaying a suggested path on the display for locating the target object in the region of interest.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

An embodiment of the present invention provides a first device that can communicate with the communication network, through the micro-tower, in order to download the relevant information for the region of interest. The embodiment of the present invention also provides the calculation of the acquisition path that can be performed by either the first device or the second device depending on the computing resources available when the first device crosses the geofence. Once the acquisition path is available within the first device, the augmented reality module can overlay the output of the camera for presentation in the graphical display window.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which image information is expressed is not critical to some embodiments of the invention. For example, in some embodiments, image information is presented in the format of (X,Y); where X and Y are two coordinates that define the location of a pixel in an image.

The phrase "region of interest" referred to herein is defined to be an enclosed interior region, selected by a user, serviced by a communication path that can include micro-towers as an extension and part of the communication path. The term "geo-fence" referred to herein is defined to be a communication boundary established by a segment of a communication network. One of the purposes of the geo-fence is to alert a communication device that it has entered or left the region of interest. The term "items of interest" referred to herein is defined to be any desired element or commodity which is housed within the region of interest.

The phrase "relevant information" referred to herein comprises the information relating to items of interest to the user, such as local business, hours of operation, advertised specials, location of inventory, maps, and nearby community or personal information.

The term "micro-tower" is defined to be any short range repeater that is coupled to a communication network for providing limited range access to the communication network when direct access is not available.

The term "module" referred to herein can include software, hardware, or a combination thereof in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
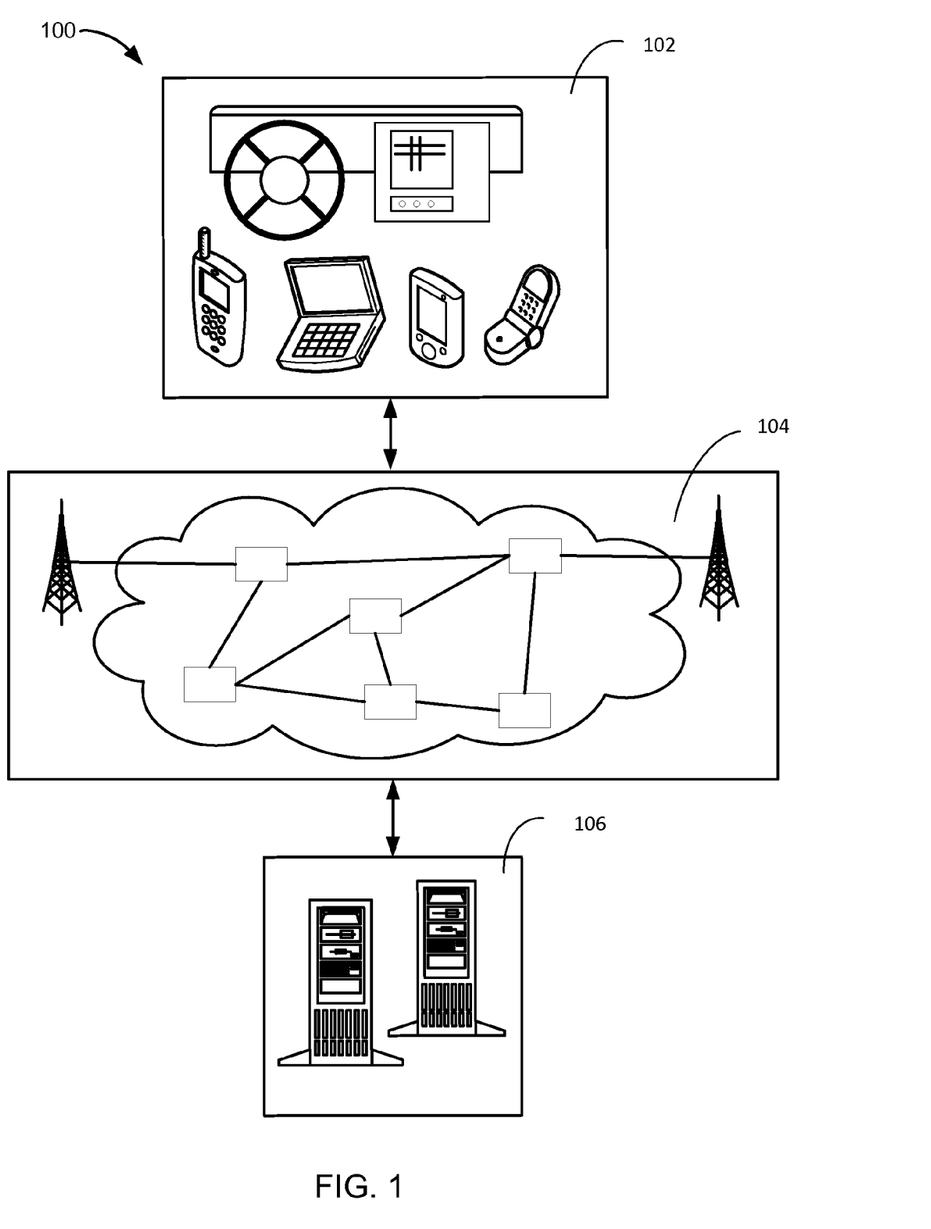
FIG. 1 is a communication system with indoor navigation mechanism in a first embodiment of the present invention.

Referring now to FIG. 1, therein is shown is a communication system 100 with indoor navigation mechanism in a first embodiment of the present invention. The communication system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the communication system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, or embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or the like. Yet another example, the second device 106 can be a particularized machine, such as a portable computing device, a thin client, a notebook, a netbook, a smartphone, personal digital assistant, or a cellular phone.

For illustrative purposes, the communication system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the communication system 100 is shown with the second device 106 and the first device 102 as end points of the communication path 104, although it is understood that the communication system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
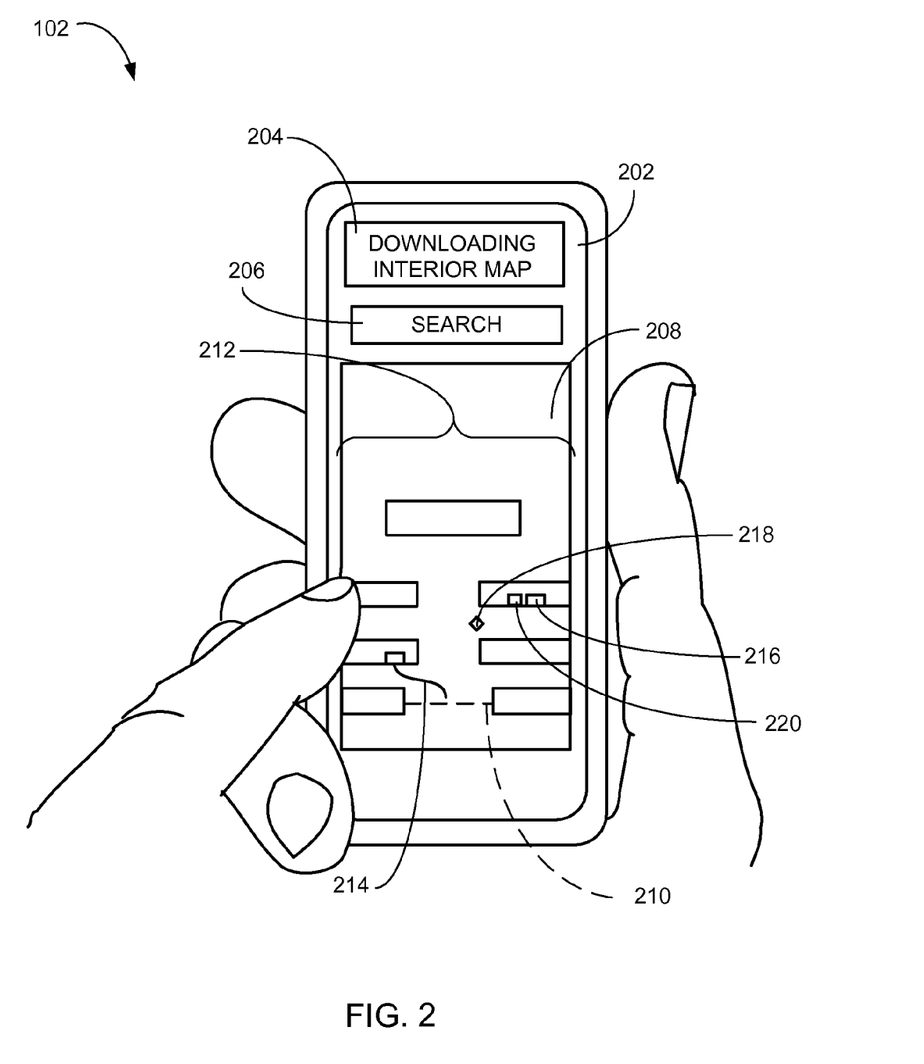
FIG. 2 is an example of a display of the first device.

Referring now to FIG. 2, therein is shown an example of a display 202 of the first device 102. The display 202 can provide textual and graphical communication between the first device 102 and the second device 106 of FIG. 1. The display 202 can be configured to depict a status window 204, a search input window 206, and a graphical display window 208.

The first device 102, the second device 106, or a combination thereof can be configured to detect a crossing of a geo-fence 210, marking an entry or exit of a region of interest 212, as displayed on the graphical display window 208, and take appropriate action based on the region of interest 212. The region of interest 212 is defined to be an enclosed interior region serviced by micro-towers as an extension and part of the communication path 104 of FIG. 1. For example, if the region of interest 212 is a grocery store, the action taken by the first device 102 can be to accept a map and inventory location for the grocery store. The status window 204 can display the current activity taken by the first device 102, such as downloading map, sorting inventory location, comparing to shopping list, identifying purchase locations, or commence shopping.

The graphical display window 208 can present a suggested path 214 to locate a target object 216. The graphical display window 208 can also be configured to present an augmented reality display that can have target object markers 218 which lead to the target object 216. The target object markers 218 can be displayed as additional information markers that provide additional information if the target object markers 218 are selected on the graphical display window 208. The additional information can include detailed information about the target objects 216, suggestions for alternative sources 220 of the target objects 216, sale or coupon information, or a combination thereof.

The first device 102 can be configured to provide alternative sources of the target objects 216, such as multiple stores within a shopping mall, different brands of the target object 216, or a combination thereof. The target object markers 218, when selected, can provide comparisons between the target objects 216 and the alternative sources 220, such as "name brand" products and "generic" versions of those products. The first device 102 can be further configured to provide complimentary items that might accompany the target objects 216. By way of an example, if the target object 216 is a hammer the complimentary items can include nails or eye protection.

The graphical display window 208 can display coupons for the target objects 216 or notify of upcoming sales on the target objects 216. If the region of interest 212 is a shopping mall, there can be multiple sources for the target objects 216 that can be listed by cost or popularity. The first device 102 can search an inventory of the mall and deliver a list of options of where the target objects 216 can be found based on the configured priority.

The search input window 206 can provide an input to a pre-configured list or it can allow identification of target objects 216 for display of availability, price, location, or a combination thereof. By way of an example, if the region of interest 212 is a museum, the search input window 206 can be used to identify the target object 216 or item within the museum for viewing.

The graphical display window 208 can provide a graphical display of the interior map of the region of interest 212, the suggested path 214 through the region of interest 212 to locate the target objects 216, or an augmented reality display of the region of interest 212 with the target objects 216 identified by the target object markers 218. The graphical display window 208 can receive input from the communication path 104 of FIG. 1, a camera (not shown) within the first device 102, or a combination thereof. The augmented reality display in the graphical display window 208 can combine the input from the camera and the input from the communication path 104 in order to assist in the location and identification of the target objects 216.

It is understood that the size, location, and arrangement of the status window 204, the search input window 206, and the graphical display window 208 is an example only and can differ. The display 202 can include more or fewer windows as the elements of each can be combined into the graphical display window 208 without changing their function.

Figure 3:
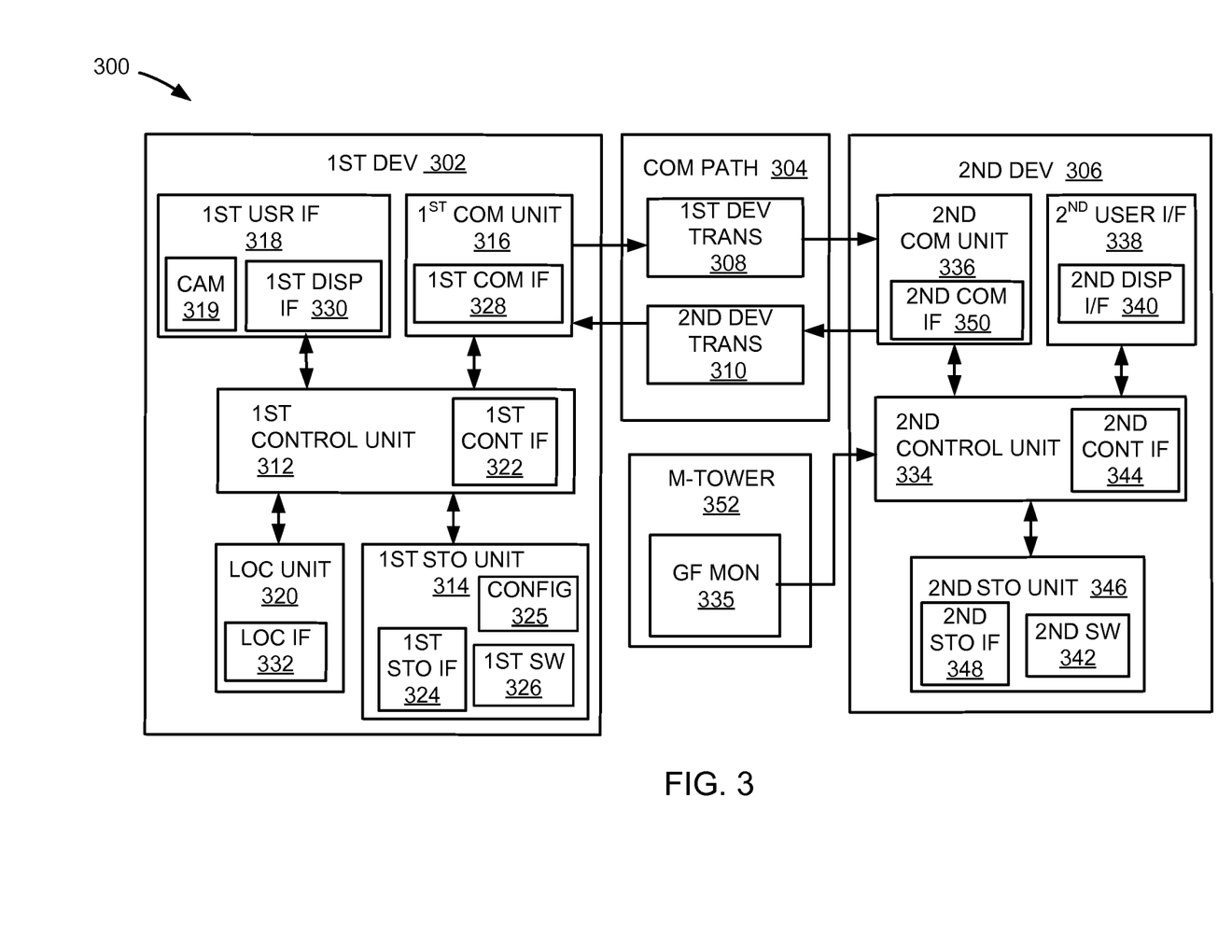
FIG. 3 is an exemplary block diagram of a communication system with indoor navigation mechanism.

Referring now to FIG. 3, therein is shown an exemplary block diagram of a communication system 300 with indoor navigation mechanism. The first device 302 can include a first device 302, a communication path 304, and a second device 306.

The first device 302 can communicate with the second device 306 over the communication path 304. For example, the first device 302, the communication path 304, and the second device 306 can be the first device 102 of FIG. 1, the communication path 104 of FIG. 1, and the second device 106 of FIG. 1, respectively.

The first device 302 can send information in a first device transmission 308 over the communication path 304 to the second device 306. The second device 306 can send information in a second device transmission 310 over the communication path 304 to the first device 302.

For illustrative purposes, the communication system 300 is shown with the first device 302 as a client device, although it is understood that the communication system 300 can have the first device 302 as a different type of device. For example, the first device 302 can be a server.

Also for illustrative purposes, the communication system 300 is shown with the second device 306 as a server, although it is understood that the communication system 300 can have the second device 306 as a different type of device. For example, the second device 306 can be a client device.

For brevity of description in this embodiment of the present invention, the first device 302 will be described as a client device and the second device 306 will be described as a server device. The present invention is not limited to this selection for the type of devices. The selection is an example of the present invention.

The first device 302 can include a first control unit 312, a first storage unit 314, a first communication unit 316, a first user interface 318, and a location unit 320. The first device 302 can be similarly described by the first device 102. The first communication unit 316 can be communicatively coupled to the first control unit 312 and configured to convey relevant information, such as inventory physical location, price, product information, and the like, to the first storage unit 314.

The first control unit 312 can include a first control interface 322. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be implemented in different ways and can include different implementations depending on which functional units or external units are being interfaced with the first control interface 322. For example, the first control interface 322 can be implemented with a pressure sensor, an inertial sensor, a micro-electromechanical system (MEMS), optical circuitry, waveguides, wireless circuitry, wire-line circuitry, or a combination thereof.

The first storage unit 314 can include a first storage interface 324. The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM). The first storage unit 314 can receive and store the down-loaded map of the region of interest 212 of FIG. 2 and the additional information, such as the inventory and location of the target objects 216 of FIG. 2 within the region of interest 212.

The first storage interface 324 can receive information from the other functional units or from external sources, or can transmit information to the other functional units or to external destinations. The external sources and the external destinations refer to sources and destinations external to the first device 302. A first configuration 325 can store the optional configurations of the first device 302. The first configuration 325 can be maintained in the first storage unit 314 to control the operations of identification and location of the target objects 216. The first configuration 325 can modify the operation of the first control unit 312 in identifying and displaying the target objects 216 and the alternative sources 220 of FIG. 2. A first software 326 can be stored in the first storage unit 314.

The first communication unit 316 can include a first communication interface 328. The first communication unit 316 can function as a communication hub allowing the first device 302 to function as part of the communication path 304 and not limited to be an end point or terminal unit to the communication path 304. The first communication unit 316 can include active and passive components, such as microelectronics or an antenna, for interaction with the communication path 304. The first communication interface 328 can be used for communication between the first communication interface 328 and other functional units in the first device 302. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 can include a camera 319 and a first display interface 330. The first user interface 318 can include an input device and an output device. Examples of the input device of the first user interface 318 can be the camera 319 and can also include a keypad, a touchpad, soft-keys, a keyboard, a microphone, or any combination thereof to provide data and communication inputs. Examples of the output device of the first user interface 318 can include the first display interface 330. The first display interface 330 can include a display, a projector, a video screen, a speaker, or any combination thereof.

The first user interface 318 can be the entry device for the configuration information, a pre-determined list of the target objects 216, additional or original entries of the target objects 216, selection of the target object markers 218 of FIG. 2, or a combination thereof. Information entered through the first user interface 318 can be stored, for later use or direct access, in the first storage unit 314.

The location unit 320 can include a location interface 332. The location unit 320 can generate location information, current heading, and current speed of the first device 302, as examples. The location unit 320 can be implemented in many ways. For example, the location unit 320 can function as at least a part of a global positioning system (GPS), an inertial navigation system, a cellular-tower location system, a pressure location system, or any combination thereof. The location interface 332 can receive information from the other functional units or from external sources, or can transmit information to the other functional units or to external destinations. The external sources and the external destinations refer to sources and destinations external to the first device 302.

The location interface 332 can include different implementations depending on which functional units or external units are being interfaced with the location unit 320. The location interface 332 can be implemented with technologies and techniques similar to the implementation of the first control interface 322.

The performance, architectures, and type of technologies can also differ between the first device 102 and the first device 302. For example, the first device 102 can function as a single device embodiment of the present invention and can have a higher performance than the first device 302. The first device 302 can be similarly optimized for a multiple device embodiment of the present invention.

The second device 306 can be optimized for implementing the present invention in a multiple device embodiment with the first device 302. The second device 306 can provide the additional or higher performance processing power compared to the first device 302. The second device 306 can include a second control unit 334, a second communication unit 336, and a second user interface 338.

The second user interface 338 allows a user (not shown) to interface and interact with the second device 306. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 306 of the communication system 300. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the communication system 300, including operating the second communication unit 336 to communicate with the first device 302 over the communication path 304. The second control unit 334 can also receive a service request from a geo-fence monitor 335 in a micro-tower 352 that is positioned at the entrance of the region of interest 212 of FIG. 2. The service request from the geo-fence monitor 335 can cause the second control unit 334 to initiate a transfer of relevant information through the second device transmission 310 to the first device 302.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 306. The second controller interface 344 can also be used for communication that is external to the second device 306.

The second controller interface 344 can receive information from the other functional units or from external sources, or can transmit information to the other functional units or to external destinations. The external sources and the external destinations refer to sources and destinations external to the second device 306.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the communication system 300 is shown with the second storage unit 346 as a single hierarchy storage system, although it is understood that the communication system 300 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 306. The second storage interface 348 can also be used for communication that is external to the second device 306.

The second storage interface 348 can receive information from the other functional units or from external sources, or can transmit information to the other functional units or to external destinations. The external sources and the external destinations refer to sources and destinations external to the second device 306.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 306. For example, the second communication unit 336 can permit the second device 306 to communicate with the first device 302 over the communication path 304.

The second communication unit 336 can also function as a communication hub allowing the second device 306 to function as part of the communication path 304 and not limited to be an end point or terminal unit to the communication path 304. The second communication unit 336 can include active and passive components, such as microelectronics or an antenna, for interaction with the communication path 304.

The second communication unit 336 can include a second communication interface 350. The second communication interface 350 can be used for communication between the second communication unit 336 and other functional units in the second device 306. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 304 to send information to the second device 306 in the first device transmission 308. The second device 306 can receive information in the second communication unit 336 from the first device transmission 308 of the communication path 304.

The second communication unit 336 can couple with the communication path 304 to send information to the first device 302 in the second device transmission 310. The first device 302 can receive information in the first communication unit 316 from the second device transmission 310 of the communication path 304. The communication system 300 can be executed by the first control unit 312, the second control unit 334, or a combination thereof.

For illustrative purposes, the second device 306 is shown with the partition having the second user interface 338, the second storage unit 346, the second control unit 334, and the second communication unit 336, although it is understood that the second device 306 can have a different partition. For example, the second software 342 can be partitioned differently such that some or all of its function can be in the second control unit 334 and the second communication unit 336. In addition, the second device 306 can include other functional units not shown in FIG. 3 for clarity.

The functional units in the first device 302 can work individually and independently of the other functional units. The first device 302 can work individually and independently from the second device 306 and the communication path 304.

The functional units in the second device 306 can work individually and independently of the other functional units. The second device 306 can work individually and independently from the first device 302 and the communication path 304.

For illustrative purposes, the communication system 300 is described by operation of the first device 302 and the second device 306. It is understood that the first device 302 and the second device 306 can operate any of the modules and functions of the communication system 300. For example, the first device 302 is described to operate the location unit 320, although it is understood that the second device 306 can also operate the location unit 320.

Figure 4:
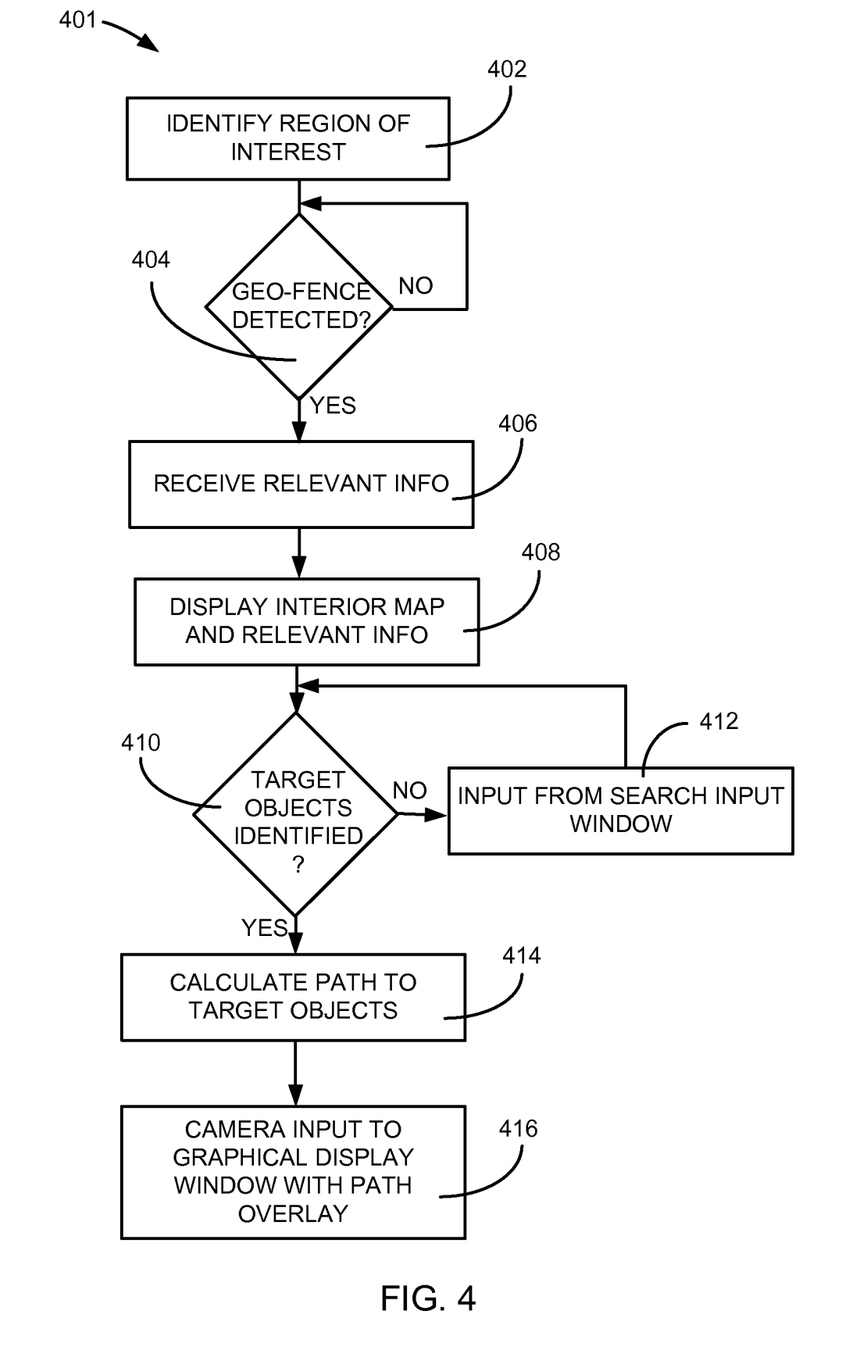
FIG. 4 is a flow chart of an exemplary method of operation of the communication system of FIG. 1.

Referring now to FIG. 4, therein is shown a flow chart of an exemplary method 401 of operation of the communication system 100 of FIG. 1. The flow chart of the exemplary method 401 depicts a set region module 402, in which the user can configure the first device 102 of FIG. 1 to identify and respond to the region of interest 212 of FIG. 2. The region of interest 212 can be a shopping mall, a grocery store, a commercial warehouse, a museum, a library, or any enclosed structure that houses the target objects 216 of FIG. 2.

The flow proceeds to a geo-fence detected module 404 to determine if the first device 102 has entered the region of interest 212 established by the user. If the geo-fence detected module 404 determines that the first device 102 has not entered the region of interest 212, the flow loops by re-entering the geo-fence detected module 404 until such time as the geo-fence detected module 404 determines the first device 102 has entered the region of interest 212. The geo-fence detection module 404 can receive input from the location unit 320 of FIG. 3 when it is determined that the first communication interface 328 of FIG. 3 has established communication with the communication path 104 of FIG. 1 through the second device 106 of FIG. 1, such as a micro-tower (not shown) attributed to the region of interest 212.

The flow then proceeds to a receive relevant information module 406, in which the interior map and relevant information is loaded into the first storage unit 314 of FIG. 3. The receive relevant information module 406 can be activated by the second communication interface 350 of FIG. 3 in order to transfer the relevant information for the region of interest 212 by the second device 106 of FIG. 1 to the first device 102. The relevant information can include, but is not limited to, an interior map of the region of interest 212, inventory location of all of the commodities or elements within the region of interest 212, discount or special purchase information, areas of service or support, or a combination thereof. By way of example the relevant information module 406 can download a map of the interior of a warehouse membership store, a table of the location of all inventory items, the location of rest rooms, the location of customer service counters, the location of check-out counters, or a combination thereof for access and display by the first user interface 318 of FIG. 3 on the graphical display window 208 of FIG. 2.

The flow then proceeds to a display interior map module 408, in which the receive information from the relevant information module 406 is processed by the first control unit 312 of FIG. 3 and transferred to the display 202 of FIG. 2 for presentation in the graphical display window 208. Once the downloaded interior map is presented in the graphical display window 208, the flow proceeds to a target object identified module 410. The target object identified module 410 can examine the storage unit 304 of FIG. 3 to determine if the target object 216 has previously been entered. In an example, the storage unit 304 can contain a grocery list having several of the target objects 216 within the region of interest 212 including quantity and options, such as types or flavors of bread.

If the target object identified module 410 determines that the target object 216 has not been stored in the storage unit 304, the flow proceeds to an input search module 412. The input search module 412 can query the user interface 302 of FIG. 3 to determine whether an input has been processed through the search input window 206 of FIG. 2. The flow then returns to the target object identified module 410 to determine that a target object 216 has been entered. The flow can remain looping until the target object 216 is detected. When the target object identified module 410 determines that the target object 216 has been entered, the flow proceeds to a calculate path module 414.

In the calculate path module 414, the first control unit 312 can identify the location of the target object 216 based on the inventory location of the commodities or elements in the region of interest 212. The identified locations can be listed in sequential order based on the distance from the geo-fence 210 of FIG. 2. By combining the interior map of the region of interest 212 with the identified locations, the first control unit 312 can calculate the suggested path 214 of FIG. 2 to the target object 216. The flow then proceeds to an augmented reality module 416.

The augmented reality module 416 can activate the camera 319 of FIG. 3 and overlay a portion of the suggested path 214 to the target object 216 for presentation in the graphical display window 208. The target object markers 218 of FIG. 2 can be configured for display in place of or in complement of the suggested path 214. The target object markers 218 can provide additional information about the location of the target object 216 that it is indication. The additional information can include any coupons, specials, or complimentary items associated with the target object 216.

It is understood that the modules of the exemplary method 401 are an example of the implementation of the present invention and other implementations are possible. The resulting display presented in the graphical display window 208 can present an efficient approach to visiting or acquiring multiple items of the target object 216 within the region of interest 212. It is further understood that the calculation of the suggested path 214 can be performed by the second device 106 if additional processing power is required to support the first device 102.

Figure 5:
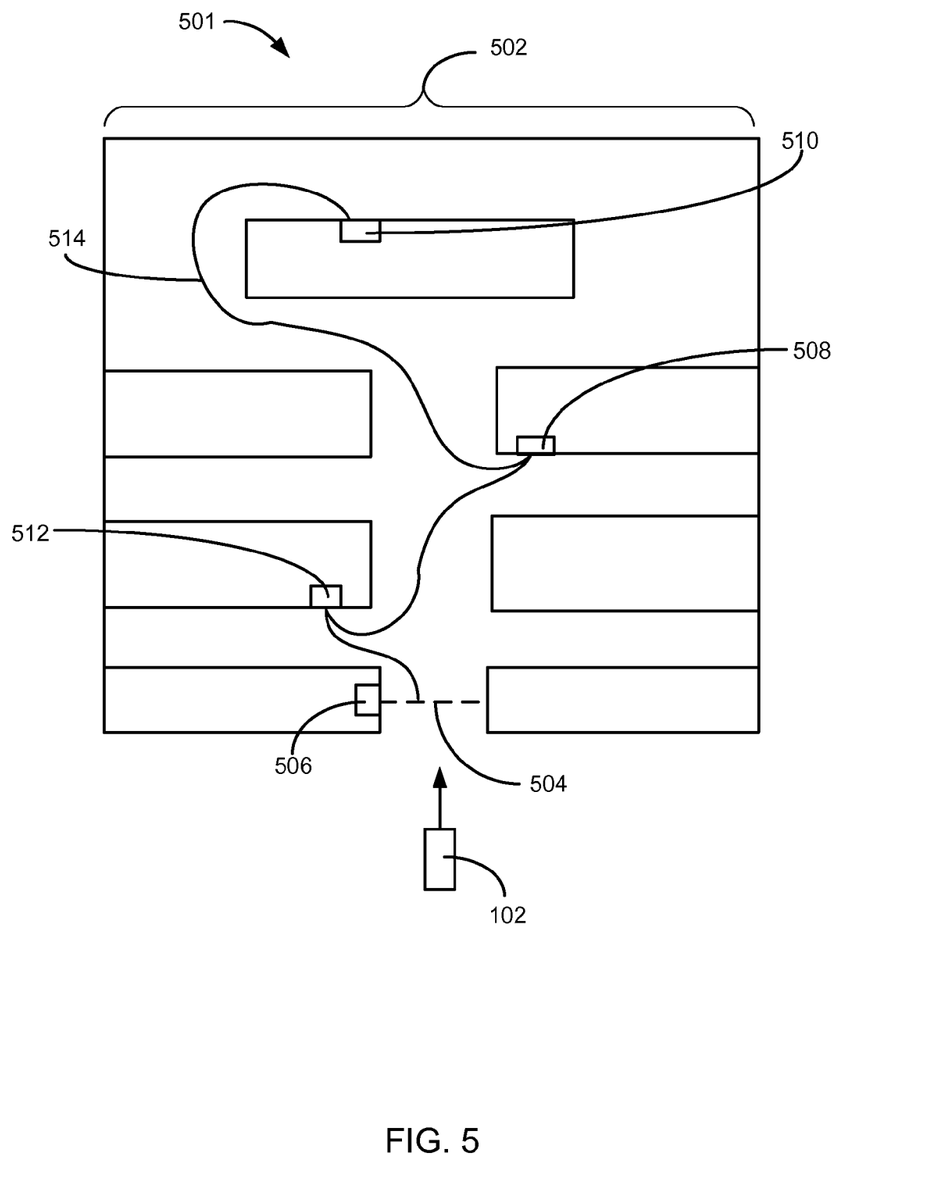
FIG. 5 is a floor plan of a region of interest as displayed by on the display interface of the first device of FIG. 2.

Referring now to FIG. 5, therein is shown a floor plan of a region of interest as displayed by on the display interface of the first device of FIG. 2. The floor plan of the region of interest 501 depicts an interior map 502 of the region of interest 501 having a geo-fence 504 positioned at an entry. The geo-fence 504 can be provided by a micro-tower 506 that is linked to the communication path 104 of FIG. 1.

The first device 102 can enter the region of interest 501, such as a library, a museum, a membership warehouse store, or a shopping mall. The first device 102 can have the pre-defined list of the target objects 216 of FIG. 2 including a first target object 508, a second target object 510, and a third target object 512.

Crossing the geo-fence 504 can initiate the first device 102 to receive the interior map, inventory of locations of the elements or commodities, and other relevant information related to the region of interest 501. The first device 102 can calculate an acquisition path 514 for locating the first target object 508, the second target object 510, and the third target object 512 within the region of interest 501.

Based on the distance from the geo-fence 504, the acquisition path 514 can start by progressing to the location of the third target object 512. The acquisition path 514 then proceeds to the first target object 508, and to the second target object 510. The acquisition path 514 represents the most efficient order of locating the first target object 508, the second target object 510, and the third target object 512 because the order of the items of interest is determined by the closest distance to the geo-fence 504.

Figure 6:
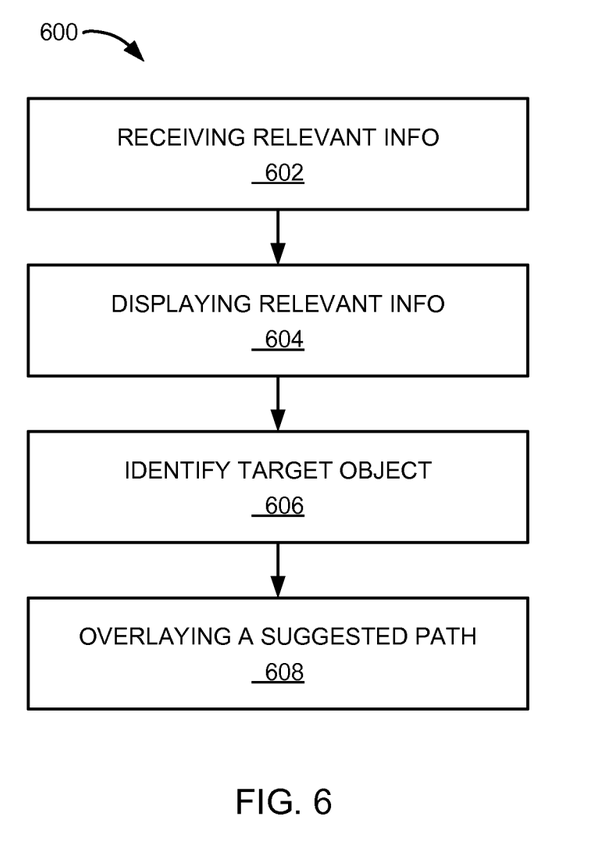
FIG. 6 is a flow chart of a method of operation of a communication system in a further embodiment of the present invention.

Referring now to FIG. 6, therein is shown a flow chart of a method of operation of a communication system in a further embodiment of the present invention. The method 600 includes: receiving relevant information by entering a region of interest in a block 602; displaying on a display the relevant information of the region of interest in a block 604; identifying a target object from the relevant information including identifying alternative sources of the target object in a block 606; and overlaying a suggested path on the display for locating the target object in the region of interest in a block 608.

It has been discovered that the first device 102 of FIG. 1 can communicate with the communication network 104 of FIG. 1, through the micro-tower 506 of FIG. 5, in order to download the relevant information for the region of interest 501 of FIG. 5. It has also been discovered that the calculation of the acquisition path 514 of FIG. 5 can be performed by either the first device 102 or the second device 106 of FIG. 1 depending on the computing resources available when the first device 102 crosses the geo-fence 504 of FIG. 5. Once the acquisition path 514 is available within the first device 102, the augmented reality module 416 of FIG. 4 can overlay the output of the camera 319 of FIG. 3 for presentation in the graphical display window 208 of FIG. 2.

The physical transformation by the augmented reality module 416 results in movement in the physical world, such as people using first device 102, based on the operation of the communication system 100 of FIG. 1. As the movement in the physical world occurs, the movement itself creates additional information that is converted back to the segment of the acquisition path 514 for the continued operation of the communication system 100 and to continue the movement in the physical world.

Thus, it has been discovered that the communication system 100 and device of the present invention furnishes important and heretofore unknown and unavailable solutions, capabilities, and functional aspects for locating the first target object 508 of FIG. 5, the second target object 510 of FIG. 5, and the third target object 512 of FIG. 5 within the region of interest 501. It has also been discovered that businesses can manage positions and locations of their items, sections, and regions on the interior maps 502 of FIG. 5 to better help guide users to their items of interest.

It is understood that the description of the first target object 508, the second target object 510, and the third target object 512 is by way of an example and a different number of the items of interest is likely. It is further understood that the acquisition path 514 is dynamic and can be recalculated if the user deviates from the acquisition path 514 in order to visit a customer support station or a rest room. It is still further understood that the augmented reality module 416 of FIG. 4 can be a dedicated hardware module or a combination of hardware and software, located in either the first device 102 or the second device 106, for overlaying the output of the camera 319 with the segment of the acquisition path 514 that is visible through the camera 319 of FIG. 3.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A communication system comprising:
a first storage unit configured to receive relevant information based on entry of the communication system into a region of interest;
a first control unit, coupled to the first storage unit, configured to:
process the relevant information
identify a location of a target object within the region of interest;
provide information for a complimentary item associated with the target object;
display, coupled to the first control unit, configured to display the relevant information, the target object, and a suggested path to the target object.

2. The system as claimed in claim 1 further comprising a first user interface coupled to the first control unit, configured to display the suggested path including target object markers leading to the target object.

3. The system as claimed in claim 1 further comprising a camera, coupled to the first control unit, configured to record the region of interest for presentation as an augmented reality on the display.

4. The system as claimed in claim 1 further comprising:
a camera configured to record the region of interest; and
wherein:
the display includes a graphical display window for displaying an output of the camera.

5. The system as claimed in claim 1 wherein the display includes:
a search input window for receiving the target object; and
a graphic display window for displaying the search input window.

6. The system as claimed in claim 1 further comprising:
a first communication unit, communicatively coupled to the first control unit, configured to convey the relevant information to the first storage unit;
a first user interface, coupled to the display, configured to display the target object, an alternative source, and an interior map; and
wherein:
the first storage unit includes a first configuration for modifying the operation of the first control unit to identity the target object, and the alternative source.

7. The system as claimed in claim 1 further comprising a first user interface, coupled to the display, configured to display the suggested path on a graphical display window with target object markers leading to the target object.

8. The system as claimed in claim 1 further comprising a camera, coupled to the first control unit, configured to record the region of interest for displaying of an augmented reality includes a target object marker leading to the target object.

9. The system as claimed in claim 1 wherein the first user interface includes:
a camera configured to record the region of interest for the first control unit to correlate an interior map and an output of the camera; and
a graphical display window configured to display a location of the target object and target object markers on the output of the camera.

10. The system as claimed in claim 1 wherein the display includes:
a search input window configured to receive the target object; and
a graphic display window for displaying the region of interest in an augmented reality with the suggested path and a target object marker.

11. A method of operation of a communication system comprising:
receiving relevant information based on detection of the communication system entering a region of interest;
displaying on a display the relevant information of the region of interest;

identifying a target object from the relevant information including identifying alternative sources of the target object;

providing information for a complimentary item associated with the target object; and overlaying a suggested path on the display for locating the target object in the region of interest.

12. The method as claimed in claim 11 wherein overlaying the suggested path includes displaying an interior map on the display and inserting the suggested path leading to the target object.

13. The method as claimed in claim 11 wherein entering the region of interest includes crossing a geo-fence into the region of interest.

14. The method as claimed in claim 11 wherein displaying on the display the relevant information includes:

extracting an interior map of the region of interest from the relevant information;

determining a location of the target object in the interior map; and calculating an acquisition path through the interior map to the target object.

15. The method as claimed in claim 11 further comprising displaying a target object marker on the display for accessing the alternative sources of the target object.

16. The method as claimed in claim 11 wherein:

receiving the relevant information based on entering a region of interest includes storing the relevant information in a first storage unit;

displaying on the display the relevant information of the region of interest includes extracting an interior map from the first storage unit;

identifying the target object from the relevant information including identifying alternative sources of the target object includes accessing a search input window for identifying the target object; and overlaying the suggested path on the display for locating the target object in the region of interest includes displaying the interior map with the suggested path to the target object.

17. The method as claimed in claim 11 wherein entering the region of interest includes crossing a geo-fence into the region of interest including activating a first configuration for receiving the relevant information.

18. The method as claimed in claim 11 wherein entering the region of interest includes crossing a geo-fence and transferring an interior map through the second device transmission.

19. The method as claimed in claim 11 wherein displaying on the display the relevant information includes:

accessing a first configuration for managing the relevant information;

determining a location of the target object and the alternative sources in the interior map; and calculating an acquisition path through an interior map to the target object and the alternative sources of the target objects.

20. The method as claimed in claim 11 further comprising displaying a target object marker on the display for accessing the alternative sources of the target object, including displaying the complimentary items, coupons, or a combination thereof.

* * * * *